United States Patent [19]

Wilkinson

[11] 4,173,122

[45] Nov. 6, 1979

[54] INTERMITTENT BURNING JET ENGINE

[75] Inventor: David B. Wilkinson, Xenia, Ohio

[73] Assignee: The United States of America as represented by the Secretary of the Air Force, Washington, D.C.

[21] Appl. No.: 876,442

[22] Filed: Feb. 9, 1978

[51] Int. Cl.² .............................................. F02K 7/02
[52] U.S. Cl. ................................... 60/247; 60/270 R
[58] Field of Search ................... 60/39.76, 39.77, 247, 60/248, 249, 270 R

[56] References Cited

U.S. PATENT DOCUMENTS

| 2,647,365 | 8/1953 | Myers | 60/270 R |
| 2,745,248 | 5/1956 | Winter et al. | 60/247 |
| 2,834,183 | 5/1958 | Bertin et al. | 60/249 |
| 3,533,239 | 10/1970 | Ghougasian | 60/247 |

Primary Examiner—Louis J. Casaregola
Attorney, Agent, or Firm—Joseph E. Rusz; Richard J. Killoren

[57] ABSTRACT

An intermittent burning ramjet engine having a rough wall combustor with fuel supplied to a fuel injector upstream of the combustor. The fuel is cyclically ignited at a predetermined frequency. A resonator tuned to a frequency less than one-tenth of the combustor frequency is positioned between the combustor and the ramjet inlet.

3 Claims, 1 Drawing Figure

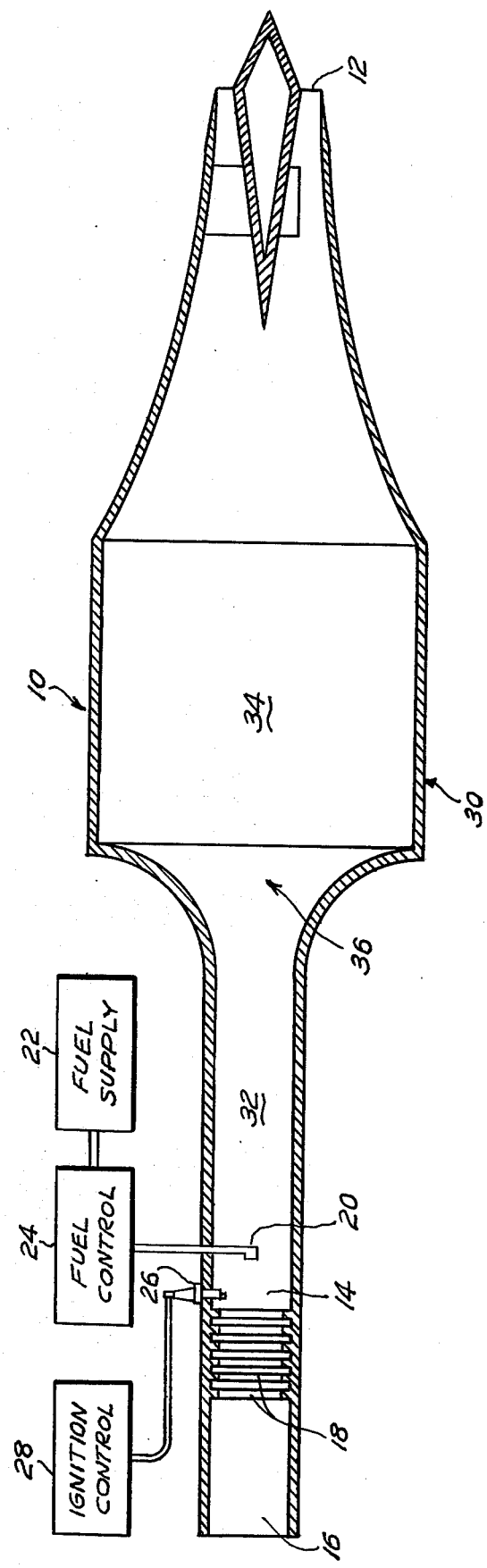

INTERMITTENT BURNING JET ENGINE

RIGHTS OF THE GOVERNMENT

The invention described herein may be manufactured and used by or for the Government of the United States for all governmental purposes without the payment of any royalty.

BACKGROUND OF THE INVENTION

This invention relates to an intermittent burning jet engine.

Transient overpressures generated by intermittent and abrupt combustion in a combustor increase the mass averaged exit jet velocity substantially over what could be obtained with steady heat addition with the same inlet conditions and exit static pressure. However, there is a problem in matching intermittent combustions to steady flow upstream components which provide air to the burner.

With instantaneous constant volume combustion, such as occurs in an ideal pulsejet, combustion will cause the pressure to rise in the chamber by a factor of between 4 and 5.

Pressure fluctuations of this magnitude cannot be tolerated in the inlet diffuser of a ramjet engine.

In the present state of the art ramjet inlet diffusers can be designed to withstand pressure fluctuations of approximately 1/100 of this level. If intermittent burning is to be employed in a ramjet engine, some means must be provided for reducing the pressure fluctuations seen by the inlet diffuser, to ensure that the inlet shock wave is not blown out of the inlet diffuser.

BRIEF SUMMARY OF THE INVENTION

According to this invention, a ramjet having an intermittent burning combustor is provided with a resonator upstream of the combustor which is tuned to a frequency less than one-tenth of the frequency of the intermittent burning combustor.

The combustor is provided with a rough wall to accelerate combustion in a manner known in the art.

IN THE DRAWING

The single FIGURE is a partially schematic view of a ramjet engine according to the invention.

DETAILED DESCRIPTION OF THE INVENTION

Reference is now made to the drawing which shows a ramjet engine 10, having an inlet 12, a combustor 14 and an exit nozzle 16. Protuberances 18 are located in the combustor 14 to provide a rough wall to accelerate combustion. Fuel is supplied to fuel injector 20 from supply 22 through fuel control 24. A spark plug ignitor 26 is controlled by an ignition control circuit 28. The ignition control circuit could be a cam operated switch or an electronic circuit for pulsing the spark plug at a predetermined frequency. The fuel control could be a conventional ramjet fuel control system or could be a fuel injection system for cyclically injecting fuel just prior to ignition, which would allow gas not containing fuel to pass through the combustion chamber between combustion pulsations.

To keep the intermittent combustor pulsations from effecting the inlet flow, a resonator 30, including inlet duct 32 and resonant chamber 34, is provided between the combustor and the ramjet inlet 12.

The amplitude of the pulsations within a resonator with respect to the amplitude of the exciting frequency is approximately proportional to the square of the ratio of the natural frequency of the resonator to the exciting frequency when the exciting frequency is substantially higher than the natural frequency of the resonator. Thus by making the exciting frequency at least ten times the natural frequency of the resonator, the amplitude of the pulsations will be reduced by a factor of about 100 thus making it come within the pulsation tolerance levels for which ramjet inlets can be designed.

For example a ramjet designed to operate at a speed of Mach 2.5 having the combustor 14 spaced about 6 ft from the outlet 36 of the resonant chamber 34 with the duct 32 having a diameter of one foot and the resonant chamber 34 having a larger diameter than duct 32 and a volume of approximately 70 cu ft will provide a resonator with a natural frequency of between 10 and 11 cps.

$$F_n = \tfrac{1}{2}\pi\sqrt{\frac{c^2 A}{l_e V}}$$

where $F_n$=natural frequency of resonator, c is the speed of sound for the stagnation temperature corresponding to a speed of Mach 2.5 or approximately 1600 ft/sec, A is the area of inlet duct 32, $l_e$ is the effective length of inlet tube 32 where $$l_e = l_{actual} + 0.8\sqrt{A}$$

and V is the volume of chamber 34.

The pulsing frequency for the ignition control can be approximately 110 pulses per sec which will bring the pulsations in chamber 34 and at inlet 12 within the design capability for ramjet engine inlets.

With the use of rough wall combustion chamber to accelerate combustion, the conventional flameholder is not needed. Thus the flame is not maintained between igniter pulsations.

There is thus provided a ramjet engine with an increased mass averaged exit jet velocity substantially over what could be obtained with steady heat addition with the same inlet conditions and exit static pressure.

I claim:

1. An intermittent burning ramjet engine comprising: an elongated tubular member including an inlet diffuser at one end, adapted to receive ram inlet air, and an exit nozzle at the other end; a rough wall combustor within said elongated tubular member; means for supplying fuel to said combustor; means for cyclically igniting said fuel in said combustor, at a predetermined frequency; means, positioned between said combustor and said ram air inlet, for reducing the magnitude of the pressure fluctuations in the inlet diffuser, due to the cyclical ignition of the fuel in the combustion chamber, by a factor of at least 100.

2. The device as recited in claim 1 wherein said means for reducing the pressure fluctuations in the inlet diffuser includes, a resonator tuned to a frequency less than one-tenth of the frequency of the cyclical ignition frequency.

3. The device as recited in claim 2 wherein said resonator includes a resonator chamber and an inlet duct connected between the combustor and the resonator chamber; said resonator chamber having a diameter larger than the diameter of the inlet duct.

* * * * *